(12) United States Patent
Medsker et al.

(10) Patent No.: US 6,169,145 B1
(45) Date of Patent: Jan. 2, 2001

(54) VULCANIZATION OF CARBOXYL CONTAINING ELASTOMERS USING REDUCTIVE HYDROSILYLATION WITH EXTENSION INTO DYNAMIC VULCANIZATION

(75) Inventors: Robert E. Medsker, Hartville; Raman Patel, Akron; Gary W. Gilbertson, Wadsworth; Donald R. Hazelton, Hudson, all of OH (US)

(73) Assignee: Advanced Elastomer Systems, L.P., Akron, OH (US)

( * ) Notice: Under 35 U.S.C. 154(b), the term of this patent shall be extended for 0 days.

(21) Appl. No.: 09/315,690

(22) Filed: May 20, 1999

(51) Int. Cl.⁷ .................................................. C08L 83/06
(52) U.S. Cl. ............................................ 525/100; 525/101
(58) Field of Search ...................... 525/101, 100

(56) References Cited

U.S. PATENT DOCUMENTS

| | | | |
|---|---|---|---|
| 4,332,654 | 6/1982 | Yates | 204/158 R |
| 4,791,190 | 12/1988 | Van Broekhoven | 528/483 |
| 4,845,145 | 7/1989 | Hazelton et al. | 524/426 |
| 4,933,389 | 6/1990 | Hikasa et al. | 524/523 |
| 5,051,478 | 9/1991 | Puydak et al. | 525/195 |
| 5,086,121 | 2/1992 | Hazelton et al. | 525/197 |
| 5,597,867 * | 1/1997 | Tsujimoto et al. | 525/74 |
| 5,672,660 | 9/1997 | Medsker et al. | 525/101 |

OTHER PUBLICATIONS

An article entitled "Dynamic Mechanical Properties of Thermoplastic Elastomers from Blends of Polypropylene with Copolymers of Ethylene with Vinyl Acetate" *European Polymer Journal*, vol. 28, pp. 1451–1458, published Jan. 29, 1992 by Pergamon Press Ltd, in Great Britain.

An article entitled Rubber–Thermoplastic Compositions, Part IV Thermoplastic Vulcanizates from Various Rubber–Plastic Combinations in Rubber Chem. & Technology, published Jun. 2, 1981 by the Rubber Division of the American Chemical Society in Akron, Ohio.

An abstract of Japan Kokai Tokkyo Koho JP 56050940 810508 from STN International disclosing a thermoplastic elastomer from a polyolefin resin, olefin rubber and ethylene–vinyl acetate copolymer.

* cited by examiner

*Primary Examiner*—Margaret G. Moore
(74) *Attorney, Agent, or Firm*—Samuel B. Laferty; William A. Skinner

(57) ABSTRACT

Thermoplastic vulcanizates are described which include a carbonyl containing or carbonyl functionalized rubber crosslinked with a hydrosilylation crosslinking agent activated with a platinum containing catalyst. The carbonyl containing or carbonyl functionalized rubber facilitates making thermoplastic vulcanizates with higher lubricity, better contact clarity and alternative surface properties.

17 Claims, No Drawings

VULCANIZATION OF CARBOXYL CONTAINING ELASTOMERS USING REDUCTIVE HYDROSILYLATION WITH EXTENSION INTO DYNAMIC VULCANIZATION

FIELD OF THE INVENTION

The vulcanization of carbonyl containing elastomers with a hydrosilylation crosslinking agent and a platinum containing catalyst is disclosed. This type of vulcanization is useful to prepare thermoplastic vulcanizates from carbonyl containing elastomers that cannot be crosslinked by more conventional crosslinkers which require the elastomer to have carbon to carbon double bonds. The thermoplastic vulcanizates prepared from such carbonyl containing elastomers tend to have good lubricity and surface properties.

BACKGROUND OF THE INVENTION

U.S. Pat. No. 5,672,660 discloses an effective method to prepare thermoplastic elastomer by hydrosilylation crosslinking. Its teachings are focused on the rubber being a diene-containing rubber and more preferably an elastomer with sterically unhindered carbon-carbon double bonds (column 2 lines 7–12).

U.S. Pat. No. 5,051,478 discloses a dynamically vulcanized composition, which comprises a polyolefin resin, an elastomer, and an ethylene copolymer resin such as a copolymer of ethylene and vinyl acetate or alkyl acrylate. In this invention, the ethylene copolymer resin is not vulcanized.

SUMMARY OF THE INVENTION

It has been found that hydrosilylation crosslinkers in combination with platinum containing catalysts are effective crosslinkers for elastomers with carbonyl groups and without any carbon to carbon double bonds. The crosslinking reaction is fast and can result in effective crosslinking in dynamic vulcanization reactions. This alternative crosslinking mechanism makes a new class of elastomers available as the crosslinked components of a thermoplastic vulcanizate. Preferred rubbers with carbonyl groups include, but are not limited to, ethylene-vinyl acetate copolymers, ethylene-acrylate copolymers, ethylene-methacrylate copolymers, maleated ethylene-propylene rubber, and ethylene-acrylic acid copolymers. The thermoplastic vulcanizate can also optionally contain conventional rubber with carbon to carbon double bonds as these can also be crosslinked by the same hydrosilylation crosslinking agent. Such rubbers with carbon to carbon double are preferably those with sterically unhindered double bonds as set forth in U.S. Pat. No. 5,672,660 due to their faster cure rate and more complete crosslinking.

The thermoplastic vulcanizates are useful in applications where additional surface lubricity, more contact clarity, or more polar rubber compounds are desired.

DETAILED DESCRIPTION OF THE INVENTION

This invention relates to the use of hydrosilylation crosslinking agents and platinum containing catalysts to crosslink carbonyl containing rubber. The preferred carbonyl containing rubbers are those without conventional crosslinking sites e.g. carbon to carbon double bonds. The crosslinking system can be used to form thermoplastic vulcanizates. The thermoplastic vulcanizates can optionally include more conventional rubbers, which have carbon to carbon double bonds, because the hydrosilylation crosslinking agent is also capable of crosslinking the carbon to carbon double bonds. The use of the carbonyl containing rubbers facilitates making thermoplastic elastomers with higher lubricity, better contact clarity and alternative surface properties.

The thermoplastic polymer (or polymers) is desirably from about 15 to about 85 weight percent of the combined thermoplastic and rubber polymers, more desirably from about 30 to about 70 weight percent. The thermoplastic polymer may be a melt processable thermoplastic polymer and preferably is a semi-crystalline polyolefin. The semi-crystalline polyolefins are well known to the art and are generally from about 5 or 10 to about 50 weight percent crystalline as determined by heat of fusion measurements on samples as received. The polyolefin can be a homopolymer or a copolymer. For the purpose of this application, both the terms polymer and copolymer will be interpreted as including copolymers, terpolymers, etc., so that polymer includes copolymer and copolymer includes a polymer from three or more monomers. Desirably, at least 85, 90 or 95 weight percent of the repeat units of the themoplastic olefin are from a single olefin monomer having from 2 to 8 carbon atoms and preferably at least 85, 90, or 95 weight percent are derived from ethylene or propylene monomer. The residual of up to 5, 10, or 15 weight percent of the polymer may be from a different olefin monomer and/or simply a copolymerizable monomer such as an alkyl (alk)acrylate, acrylic acid, vinyl acetate etc. having from about 3 to about 25 carbon atoms. Typically a thermoplastic polyolefin with at least 85 weight percent of a single type of olefin repeating unit has a significant amount of crystallinity and behaves as a thermoplastic rather than an elastomer.

The rubber polymer (or polymers) is desirably from about 20 to about 85 weight percent of the combined weight of the thermoplastic and rubber polymers, more desirably from about 30 to about 70 weight percent. At least one rubber polymer needs to be a carbonyl containing polymer and in some embodiments all the rubber polymers are carbonyl containing polymers. Desirably at least 10, 20, 30, 50 or 75 weight percent of all the rubbers in thermoplastic vulcanizate are rubbers with two or more carbonyl groups per polymer chain. The carbonyl containing rubber(s) can be any elastomer with generally two or more carbonyl groups per polymer. These include a polymer polymerized from at least one monomer that has a carbonyl group. Desirably the carbonyl groups would be from about 0.2 to about 0.85 moles per 100 grams of polymer. Alternatively the polymer could be one that originally did not have any carbonyl groups but which was post polymerization functionalized with carbonyl groups by grafting on a monomer, oligomer or polymer that had carbonyl groups. An example of this would be maleic anhydride functionalized ethylene-propylene rubber. Preferred carbonyl groups are those in anhydrides from dicarboxylic acids, carboxylic acids, and alkyl esters of carboxylic acids.

Examples of carbonyl containing polymers include copolymers of an alpha olefin, such as ethylene, with a carbonyl containing monomer such as vinyl acetals (e.g. vinyl acetate), acrylic acid, (alk)acrylic acid, alkyl ester of acrylic acid or (alk)acrylic acid, unsaturated anhydrides such as maleic anhydride, or unsaturated polycarboxylic acids such as itaconic acid. Preferred ethylene copolymers have less than 85 weight percent repeat units from polymerizing ethylene. Preferred carbonyl containing rubbers include ethylene-vinyl acetate copolymer, ethylene-methacrylate copolymer, ethylene-acrylic acid copolymer, ethylene-butyl acrylate copolymer, ethylene-methyl acrylate-acrylic acid terpolymer, or blends thereof. Polymers from copolymerizing at least ethylene and carbon monoxide or carbon dioxide as disclosed in U.S. Pat. No. 4,791,190 herein incorporated by reference, may also be used. Desirably the polymer would be an elastomer, which would require that the crystallinity be controlled if it were a monoolefin polymer. Monoolefin crystallinity may be controlled by limiting the amount of any single monoolefin repeating unit to less than 85 weight percent of the final polymer.

Another example of carbonyl containing polymer is a polymer, which has been post polymerization functionalized with a carbonyl containing monomer, oligomer, or polymer. There are many commercially available elastomers, such as ethylene-propylene rubber, block copolymers of a diene and a higher Tg monomer such as styrene (e.g. styrene-butadiene copolymers and styrene-isoprene copolymers either as polymerized or partially hydrogenated after polymerization such as sold under the Kraton name), and other copolymers of dienes and/or acrylates (e.g. random copolymers), which can be functionalized with a few percent of a carbonyl containing group, such as maleic anhydride group, by free radical grafting of a carbonyl containing monomer, e.g. maleic anhydride being grafted onto the elastomer.

The rubber polymer can optionally include any rubber suitable for use in a thermoplastic vulcanizate. These rubbers would generally be added to modify the properties of the thermoplastic vulcanizate. If these rubbers have carbon to carbon double bonds they may also be partially or fully crosslinked by the hydrosilylation crosslinking agent. These rubbers include ethylene-propylene-diene rubber (EPDM) (e.g. copolymer of two or more alphamonoolefins in weight ratios of 25:75 to 75:25 with 0.2 to 10 wt % of repeating units from a polyene with 5 to 15 carbon atoms based on the weight of the EPDM); various isobutylene copolymers such as butyl rubber (copolymers of isobutylene and isoprene) (optionally halogenated such as bromobutyl rubber or chlorobutyl rubber), copolymers of isobutylene and p-methylstyrene, and copolymers or terpolymers of isobutylene, isoprene, and divinyl aromatic monomers; natural rubber; homopolymers of conjugated dienes having from 4 to 8 carbon atoms, optionally including halogens, such as polybutadiene, synthetic isoprene, and chloroprene rubber; or copolymers having at least 50 weight percent repeating units from said conjugated dienes, such as nitrile rubber; and combinations thereof.

While the description above is adequate for the use of rubbers in general in thermoplastic vulcanizates, in some embodiments using hydrosilylation crosslinking the preferred rubbers with carbon to carbon double bonds are set forth below. Hydrosilylation crosslinking is taught in U.S. Pat. Nos. 4,803,244 and 5,672,660 hereby incorporated by reference. The preferred rubbers are those with residual carbon to carbon double bond unsaturation that is pendant to the polymer backbone and sterically unhindered with respect to reaction with the hydrosilylation crosslinking agent. Preferred rubbers with such sterically unhindered bonds react quickly with low concentrations of hydrosilylation crosslinking agent and low concentrations of catalyst.

Preferred rubbers with carbon to carbon double bonds for hydrosilylation crosslinking include rubbers from two or more α-monoolefins, copolymerized with a polyene, usually a non-conjugated diene such as commonly referred to as EPDM rubber. Useful polyenes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) etc.; or a combination thereof. Preferred polyenes include 5-vinyl-2-norbornene (VNB), 5-ethylidene-2-norbornene (ENB) and 1,4-hexadiene.

In embodiments using a blend of a first rubber with carbonyl groups and a second rubber with carbon to carbon unsaturation, it is desirable that the first rubber is at least 10, 20 or 30 weight percent of the total rubbers and the second rubber is at least 10, 20 or 25 weight percent of the total rubber in the blend.

The crosslinking system comprises a hydrosilylation crosslinking system such as described in U.S. Pat. Nos. 4,803,244 and 5,672,660, hereby incorporated by reference. Preferred silicon hydride compounds (hydrosilylation crosslinkers) include compounds of the formula Formula 1

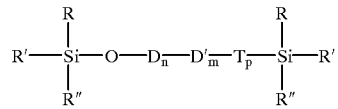

wherein each R is independently selected from the group consisting of hydrogen, alkyls comprising 1 to 20 carbon atoms, cycloalkyls comprising 4 to 12 carbon atoms and aryls. In formula (1) it is preferred that each R be independently selected from a group consisting of hydrogen and alkyls comprising 1 to 6 carbon atoms. Even more preferred is R=methyl, R' represents a hydrogen atom, an alkyl or alkoxy group having from 1 to about 24 carbon atoms, and R" represents R or a hydrogen atom.

D represents the group

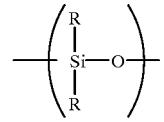

D' represents the group

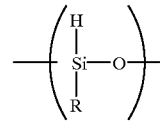

T represents the group

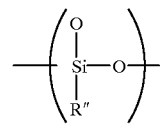

m is an integer having a value ranging from 1 to 50, n is an integer having a value ranging from 1 to 50, and p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930, which teaches alkylation of polyorganosiloxanes. Weight percent of alkylation should be limited to a level that permits adequate reaction rates and minimizes steric constraints. An example of this type of hydrosilylation crosslinking agent is DC 2-2822 used in Tables I–III. The DC 2-2822 is available from Dow Corning in Midland, Mich.

The amount of silicon hydride compound useful in the process of the present invention can range from about 0.1 to about 10.0 mole equivalents of SiH per carbonyl in the rubber, and if carbon-carbon double bonds are in the rubber per combined carbonyl and carbon-carbon double bonds, and preferably is in the range of about 0.5 to about 5.0 mole equivalents of SiH per specified groups in the rubber component of the thermoplastic elastomer.

It has generally been understood that any hydrosilylation catalyst, or catalyst precursor capable of generating a catalyst in situ, which will catalyze the hydrosilylation crosslinking reaction, can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million by weight based on the weight of the resulting thermoplastic vulcanizate and 100 to 200,000 parts per million parts by weight rubber, respectively.

Concentrations of catalyst in the range of about 0.01 to about 20, 40 or 50 parts per million parts by weight of rubber, expressed as metal (e.g. platinum), are effective in rapidly and completely curing the rubber in the process of dynamically vulcanizing blends of thermoplastic resin and rubber. Catalyst concentrations of about 0.1 to about 40 parts per million by weight expressed as metal (e.g. platinum), and based on the weight of rubber, are particularly preferred.

Platinum-containing catalysts, which are useful in the process of the invention, are described, for example, in U.S. Pat. Nos. 4,578,497; 3,220,972; and 2,823,218, all of which are incorporated herein by this reference. These catalysts include chloroplatinic acid with symdivinyltetramethyidisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred. A preferred platinum catalyst used in the examples is PC085 sold by United Chemicals Technology in Philadelphia, Pa.

In order for the catalyst to function most efficiently in the dynamic vulcanization environment, it is important that it is inherently thermally stable, or that its activity is inhibited to prevent too rapid a reaction or catalyst decomposition. Appropriate catalyst inhibitors that are suitable to stabilize the platinum catalyst at high temperatures include 1,3,5,7-tetravinyltetramethylcyclotetrasiloxane and its higher analogs such as vinyl cyclic pentamer. However, other olefins that are stable above 165° C. are also useful. These include maleates, fumarates and the cyclic pentamer. It is also particularly preferred in the invention to use a catalyst that remains soluble in the reaction medium.

It is preferred that at least 10, 20, 30 or 50 mole percent of the chemical crosslinks of said rubber are derived from the reaction of a hydrosilylation crosslinker and the carbonyl groups of said carbonyl group containing polymer. This is in direct opposition to a conventional thermoplastic vulcanizate where the crosslinks are derived from the reaction of a conventional crosslinker with carbon to carbon double bonds.

The thermoplastic vulcanizate may contain conventional additives, which can be introduced into the composition in the thermoplastic resin, the rubber, or in the blend before, during or after curing. Examples of such additives are antioxidants, processing aids, reinforcing and non-reinforcing fillers, pigments, waxes, rubber processing oil, extender oils, antiblocking agents, antistatic agents, ultraviolet stabilizers, plasticizers (including esters), foaming agents, flame retardants and other additives known to the rubber compounding art. Such additives may comprise from about 1 to about 300 percent by weight based on the weight of the thermoplastic resin and rubber in the final thermoplastic elastomer product. Fillers and extenders, which can be utilized, include conventional inorganics such as calcium carbonate, clays, silica, talc, titanium dioxide, carbon black and the like. The rubber processing oils generally are paraffinic, naphthenic or aromatic oils derived from petroleum fractions. The type of oil will be that type ordinarily used in conjunction with the specific rubber or rubbers present in the composition, and the quantity of processing oil, based on the total rubber content of the thermoplastic elastomer, may range from zero or fifty to several hundred parts by weight per hundred parts by weight of rubber. Important to the efficiency of the catalyst is that the oils and other additives contain no or very low concentrations of compounds that interfere with the activity of the catalyst. These include phosphines, amines, sulfides or other compounds that may be classified as Lewis bases.

The rubber component of the thermoplastic elastomer is generally present as small, i.e. micro-size, particles within a continuous thermoplastic resin matrix, although a co-continuous morphology or a phase inversion is also possible depending upon the amount of rubber relative to plastic and the degree of cure (crosslinking) of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as multiple-roll roll mills, Banbury mixers, Brabender mixers, continuous mixers, mixing extruders and the like. Generally after a reasonably homogenous mixture of the two phases is established, the curatives are added. Mixing is continued until maximum mixing torque is reached. Thereafter mixing is continued one or two minutes. The unique characteristics of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

EXAMPLES

The examples in Table I were prepared in a Brabender mixer using a two pass mixing procedure. The first pass was at 100 rpm and 180 C (not exceeding 220 C). The elastomer or carbonyl containing polymer (ethylene-vinyl acetate or ethylene-methyl acrylate) and polypropylene were mixed thoroughly at stock temperature of 160° C. for 4–5 minutes. Any additional oil was added. The blend was mixed for an additional two minutes to assure complete mixing and then discharged. The second pass comprised adding the blend from the first pass and heating to a stock temperature of 160° C. DC 2-2822 was added and mixed for two minutes. Platinum containing catalyst solution was added. Cure was achieved while mixing at 193–216° C. The mixing was continued for two minutes past the mixing torque peak on the Brabender. After cure, the batch was removed from the mixer and returned back to the mixer for an additional one minute of mixing.

Escorene PD 9272 is a 2.9 MFR random copolymer polypropylene containing 4.9% ethylene available from Exxon Chemical Co. The Vistalon 4709 is an EPDM with an 81 ML (1+4) at 125° C., 75 wt. % ethylene and 4.4% ENB terpolymer. Escorene LD 760 contains 27.5% vinyl acetate and has a MI of 2.3 at 190 C. Fina Syndiotactic PP EOD is a 4.4 MFR, 145,000 Mw, 56,000 psi flexural modulus polymer available from Fina in Deer Park, Tex. Optema TC 220 is an ethylene-methyl acrylate copolymer from Exxon Chemical having a MI of 5.0, a density of 0.945, and 24% methyl acrylate. USP mineral oil is available from Arco Petroleum Products in Louisiana.

Samples A and B demonstrate the prior art, i.e. the hydrosilylation of EPDM in a mixture with polypropylene. The EPDM and polypropylene produces a moderately clear thermoplastic vulcanizate.

Samples C & D show that EVA can be vulcanized with this cure chemistry as the rubbery phase in a blend with polypropylene. The uncured mixture C has a much lower level of physical properties than the cured composition and disintegrates in the hot oil test at 125 C. Cured Sample D has significantly higher tensile strength, reduced tension set, and can withstand the 100 C compression set test without melting. However, it too cannot tolerate the 125 C oil test. The resulting composition also possesses improved contact clarity over the EPDM composition and had a non-tacky surface.

Samples E & F show that ethylene-methyl acrylate is also an effective rubbery phase in these blends. The properties again show that curing this material produces a significant improvement in physical properties.

Samples G, H, I, and J show that mixtures of ethylene-vinyl acetate or ethylene-methyl acrylate with EPDM can also be used. These mixtures, especially those that are also extended with process oil, yield products with lower hardness, and improved resistance to oil swell and compression set. However, they generally have slightly poorer optical properties. Of these blends, Sample G looks particularly attractive in terms of its high tensile strength and low compression set properties.

TABLE I

| Component | Sample A | Sample B | Sample C | Sample D | Sample E |
|---|---|---|---|---|---|
| Vistalon 4709 | 100 phr | 100 | 0 | 0 | 0 |
| Escorene LD 760 | 0 | 0 | 100 | 100 | 0 |
| Optema TC 220 | 0 | 0 | 0 | 0 | 100 |
| USP mineral oil | 0 | 0 | 0 | 0 | 0 |
| Escorene PD 9272 | 20 | 20 | 20 | 20 | 20 |
| Component added in second mixing step | | | | | |
| DC 2-2822 | 0 | 3.00 | 0 | 3.00 | 0 |
| Catalyst in ppm of Pt | 0 | 9 | 0 | 6 | 0 |
| Physical Properties | | | | | |
| Shore A hardness | 68 | 73 | 80 | 81 | 78 |
| Stress 50% E, (Mpa) | 2.58 | 4.33 | 4.56 | 5.37 | 3.93 |

TABLE I-continued

| | Sample A | Sample B | Sample C | Sample D | Sample E |
|---|---|---|---|---|---|
| Stress 100% E, (Mpa) | 2.96 | 6.2 | 5.19 | 6.43 | 4.33 |
| Stress 200%, (Mpa) | 3.82 | 9.51 | 6.15 | 7.93 | 4.8 |
| Tensile, (Mpa) | 31.27 | 10.16 | 14.27 | 31.58 | 5.17 |
| Elong at Break, % | 621 | 227 | 580 | 576 | 455 |
| Tension Set, % | 20 | 20 | 35 | 32 | 33 |
| Weight gain, % in 125° C. oil | dissolved | 316 | dissolved | dissolved | dissolved |
| Compress Set, % 22 hrs @ 100° C. | 103 | 25 | melted | 82 | melted |
| Surface Condition | dry | dry | dry | dry | dry |
| Contact Clarity (1-best, 5-poorest) | 1 | 3 | 2 | 2 | 1–2 |

| Component | Sample F | Sample G | Sample H | Sample I | Sample J |
|---|---|---|---|---|---|
| Vistalon 4709 | 0 | 50 | 50 | 25 | 50 |
| Escorene LD 760 | 0 | 50 | 50 | 75 | 0 |
| Optema TC 220 | 100 phr | 0 | 0 | 0 | 50 |
| USP mineral oil | 0 | 0 | 50 | 50 | 50 |
| Escorene PD 9272 | 20 | 20 | 20 | 20 | 20 |
| Component added in second mixing step | | | | | |
| DC 2-2822 | 3.00 | 3.00 | 3.00 | 3.00 | 3.00 |
| Catalyst in ppm of Pt | 3.2 | 4.6 | 3.2 | 3.2 | 3.2 |
| Physical Properties | | | | | |
| Shore A hardness | 80 | 78 | 59 | 61 | 57 |
| Stress 50% E, (Mpa) | 5.07 | 4.72 | 2.45 | 2.35 | 2.09 |
| Stress 100% E, (Mpa) | 6.21 | 6.17 | 3.29 | 3.04 | 2.74 |
| Stress 200%, (Mpa) | 8.01 | 8.62 | 4.57 | 4.11 | 3.87 |
| Tensile, (Mpa) | 10.21 | 15.39 | 8.1 | 9.35 | 7.47 |
| Elong at break, % | 326 | 431 | 437 | 519 | 473 |
| Tension Set, % | 30 | 23 | 10 | 13 | 9 |
| Weight gain, % | 434 | 367 | 506 | 497 | 321 |
| Compress Set, % | 57 | 29 | 42 | 65 | 34 |
| Surface Condition | dry | dry | dry | oily | dry |
| Contact Clarity | 2 | 3 | 3 | 3 | 3 |

Sample K in Table II shows another thermoplastic vulcanizate produced from curing the ethylene-vinyl acetate in the presence of the same random copolymer polypropylene, but at a different ratio of ethylene-vinyl acetate to polypropylene. Unlike the former compositions, however, this was made in a single step in a Brabender mixer. The resulting composition shows a high level of tensile strength, good contact clarity, and a non-tacky surface.

Sample L & M of Table II were compounded on a Berstorff ZE-43 twin screw compounding extruder operated at 50 lbs./hr, 335 rpm, and 33 amps. Sample M represents an "uncured" physical blend of the ethylene-vinyl acetate and a syndiotactic polypropylene. The tensile strength of the uncured blend is unexpectedly high due to the fact that the ethylene vinyl acetate contains no stabilizer and may have been free radically cured to some degree at these process conditions. Addition of curative to Sample L produced a material that was softer due to the addition of oil from the Pt/oil catalyst solution and was also more elastic (tension set reduced approximately 50%). The cured material had excellent contact clarity when compression molded, better than the uncured mixture (Sample M).

TABLE II

| Component | Sample K | Sample L | Sample M |
|---|---|---|---|
| Escorene LD 760 | 100 phr | 100 | 100 |
| Escorene PD 9272 RCP | 25 | 0 | 0 |
| Fina Syndio PP EOD | 0 | 20 | 20 |
| DC 2-2822 | 3 | 3 | 0 |
| Catalyst sol'n, ppm of Pt | 6.6 | 8 | 0 |

TABLE II-continued

| Component | Sample K | Sample L | Sample M |
|---|---|---|---|
| Physical Properties | | | |
| Shore A | 85 | 75 | 83 |
| Modulus 100%, Mpa | 6.14 | 3.79 | 4.97 |
| Modulus 300%, Mpa | 7.66 | 4.97 | 6.21 |
| Tensile Strength, Mpa | 17.89 | 25.44 | 28.34 |
| Ult. Elongation, % | 640 | 710 | 680 |
| Tension Set, % | — | 21 | 38 |

Samples N, O, P, and Q are shown in Table III. The mix procedure for Table III was performed in a Brabender at 100 rpm and 175 C. The initial mix of polypropylene, rubber and oil was made. Slowly the silicon hydride (hydrosilylation) crosslinker was added. This was mixed for 30 seconds before the platinum containing catalyst solution was added. The blend was mixed at 175° C. until curing was exhibited by a maximum torque. The blend was mixed for three additional minutes. The samples were then compression molded at 204 C. Sample N is a Control made without a crosslinker. Samples O and P are partially cured since both include a low level of hydrosilylation crosslinker and a platinum containing catalyst. They showed increases in physical properties and an unreported increase in contact clarity over the control. Sample Q did not include a platinum containing catalyst and exhibited properties similar to Sample N.

TABLE III

| Component | Sample N | Sample O | Sample P | Sample Q |
|---|---|---|---|---|
| Vistalon 3708 | 100 | 100 | 100 | 100 |
| EVA LD767.36 | 132.5 | 132.5 | 132.5 | 132.5 |
| Duoprime Oil | 38 | 38 | 38 | 38 |
| SiH DP8 | — | 0.5 | 0.75 | 1.88 |
| Pt catalyst, ppm of Pt | — | 1 | 1.5 | — |
| Physical Properties | | | | |
| Shore A | 62 | 65 | 66 | — |
| Modulus 100%, Mpa | 1.72 | 1.93 | 1.93 | — |
| Modulus 300%, Mpa | — | 2.62 | 2.69 | — |
| Tensile, Mpa | 15.9 | 19.72 | 19.79 | — |
| Ultimate Elong, % | 850 | 870 | 830 | — |
| Tension set, % | — | 11 | 11 | — |

Vistalon 3708 is an EPDM rubber with a 52 ML (1+4) @125° C., 70% ethylene, 3.5% ENB and the residual being propylene, which is available from Exxon Chemical. EVA LD767.36 is a thermoplastic ethylene-vinyl acetate copolymer with a 2.9 MI and 29% vinyl acetate. It is also available from Exxon. The level of crosslinking from the silicon hydride in the thermoplastic phase is minimal.

The samples in Table IV were prepared similarly to those in Tables I and III. Sample R was crosslinked via hydrosilylation crosslinking while Sample S was prepared without a crosslinker. The physical properties of Sample R were superior to those of Sample S.

TABLE IV

Comparison of Crosslinked and Non-crosslinked Blends

| Components | Sample R | Sample S |
|---|---|---|
| Vamac G | 100 g | 100 g |
| Polypropylene | 67 | 67 |
| Compatibilizer | 9.1 | 9.1 |
| Silicone hydride (hydrosilylation crosslinker) | 3.0 | — |
| Catalyst (platinum containing) ppm Pt | 24 | — |
| Physical Properties | | |
| Shore A | 88 | 70 |
| Shore D | 33 | 20 |
| Ultimate tensile strength, Mpa | 8.10 | 4.66 |
| Ultimate elongation | 220 | 133 |
| 100% modulus, Mpa | 8.07 | 4.98 |
| Toughness, kg/mm$^2$ | 17839 | 6364 |
| Gel | 30 | 0 |

Vamac G is an ethylene-methyl acrylate copolymer with a methyl acrylate content of 55% and a melt viscosity of 16 ML (1+4) @100° C.
The compatibilizer is maleated polypropylene.
The catalyst is PC085, a platinum containing catalyst.

While in accordance with the Patent Statutes, the best mode and preferred embodiment have been set forth, the scope of the invention is not limited thereto, but rather by the scope of the attached claims.

What is claimed is:

1. A thermoplastic elastomer comprising a blend of
    a) at least one thermoplastic polyolefin having at least 85 weight percent of the repeat units derived from polymerizing a single type of monoolefin monomer and
    b) at least one rubber having carbonyl functional groups, which rubber is a copolymer of a monoolefin and one or more other monomers and having less than 85 weight percent of repeating units derived from polymerizing a single type of monoolefin monomer,
   said rubber being at least partially crosslinked via the reaction product of a hydrosilylation crosslinker, carbonyl groups of said rubber, and a hydrosilylation catalyst.

2. A thermoplastic elastomer according to claim 1, wherein the weight ratio of the total thermoplastic polyolefin to the total rubber varies from about 15:85 to 80:20.

3. A thermoplastic elastomer according to claim 1, wherein the rubber is an ethylene-vinyl acetate copolymer, ethylene-methacrylate copolymer, ethylene-acrylic acid copolymer, ethylene-methyl acrylate-acrylic acid terpolymer, or ethylene-butyl acrylate copolymer or blends thereof.

4. A thermoplastic elastomer according to claim 1, wherein said thermoplastic polyolefin is a polypropylene having at least 85 weight percent repeating units from polymerizing propylene and said rubber is an ethylene copolymer with less than 85 weight percent repeat units from polymerizing ethylene.

5. A thermoplastic elastomer according to claim 1, wherein at least 10 weight percent of the total rubber has carbonyl groups and at least 25 weight percent of the total rubber has unsaturated carbon to carbon double bonds.

6. A thermoplastic elastomer according to claim 5, wherein said at least 25 weight percent of the total rubber having unsaturated carbon to carbon double bonds is an EPDM rubber having unsaturation in the form of repeat units from 5-vinyl-2-norbornene (VNB), 5-ethylidene-2-norbornene (ENB), or 1,4-hexadiene.

7. A thermoplastic elastomer according to claim 6, wherein said rubber having carbonyl functional groups comprises an ethylene-vinyl acetate copolymer.

8. A thermoplastic elastomer according to claim 1, wherein said rubber having carbonyl functional groups is a copolymer having repeating units from polymerizing an alpha-monoolefin and from about 0.2 to about 0.85 moles of a carbonyl containing monomer or monomers per 100 grams of said rubber.

9. A thermoplastic elastomer according to claim 1, wherein said rubber having carbonyl functional groups has from about 0.2 to about 0.85 moles of carbonyl groups per 100 g of said rubber.

10. A thermoplastic elastomer according to claim 1, wherein said rubber having carbonyl functional groups is a rubber derived from polymerizing a monomer that contains a carbonyl group.

11. A thermoplastic elastomer according to claim 1, wherein said rubber having carbonyl functional groups is a polymer that has been post polymerization functionalized with a compound that contains a carbonyl group.

12. A thermoplastic elastomer according to claim 1, wherein at least 20 mole percent of the chemical crosslinks of said rubber having carbonyl functional groups are derived from the reaction of a hydrosilylation crosslinker and said carbonyl groups.

13. A process for forming a thermoplastic vulcanizate comprising the steps of
   a) melt blending
      i) at least one thermoplastic polyolefin having at least 85 weight percent of the repeat units derived from polymerizing a single type of monoolefin monomer and
      ii) at least one rubber having carbonyl functional groups, which rubber is a copolymer of a monoolefin and one or more other monomers and having less than 85 weight percent of repeating units derived from polymerizing a single type of monoolefin monomer,
   b) thereafter crosslinking said rubber via a reaction between a hydrosilylation crosslinking agent and the carbonyl groups on said rubber, with a hydrosilylation catalyst, and thereby forming a dynamic vulcanizate, and
   c) optionally further melt blending the vulcanizate.

14. A process according to claim 13, wherein said rubber having carbonyl functional groups has from about 0.2 to about 0.85 moles of carbonyl groups per 100 g of said rubber.

15. A process according to claim 13, wherein said rubber having carbonyl functional groups is at least 20 weight percent of the total rubber of said thermoplastic vulcanizate.

16. A process according to claim 13, wherein said rubber having carbonyl functional groups is at least 10 weight percent of the total rubber and wherein at least 25 weight percent of the total rubber is an EPDM rubber having unsaturation in the form of repeating units from 5-vinyl-2-norbornene (VNB), 5-ethylidene-2-norbornene (ENB), or 1,4-hexadiene.

17. A process according to claim 16, wherein said carbonyl containing or carbonyl functionalized rubber comprises an ethylene-vinyl acetate copolymer.

* * * * *